United States Patent
Tallon et al.

[11] Patent Number: 5,619,141
[45] Date of Patent: Apr. 8, 1997

[54] THERMOPOWER MAPPING OF SUPERCONDUCTING CUPRATES

[76] Inventors: Jeffery L. Tallon, 3 Marine Drive York Bay, Eastbourne 6008, New Zealand; John R. Cooper, 43 North Street Castlethorpe, Milton Keynes MK19 7EW, Great Britain; Sandro D. Obertelli, 11 View Road, London N6 4DJ, Great Britain

[21] Appl. No.: 313,260

[22] PCT Filed: Apr. 5, 1993

[86] PCT No.: PCT/NZ93/00022

§ 371 Date: Dec. 30, 1994

§ 102(e) Date: Dec. 30, 1994

[87] PCT Pub. No.: WO93/20591

PCT Pub. Date: Oct. 14, 1993

[30] Foreign Application Priority Data

Apr. 3, 1992 [NZ] New Zealand ............................ 242238

[51] Int. Cl.$^6$ .......................... G01N 27/00; G01R 27/14
[52] U.S. Cl. .......................... 324/537; 324/71.6; 505/843
[58] Field of Search .................................. 324/713, 719, 324/538, 71.6, 248, 715, 717, 654; 505/843

[56] References Cited

U.S. PATENT DOCUMENTS

| | | | |
|---|---|---|---|
| 5,065,087 | 11/1991 | Kita et al. .............................. | 324/71.6 |
| 5,134,360 | 7/1992 | Martin et al. . | |
| 5,291,142 | 3/1994 | Ohmi ...................................... | 324/719 |

OTHER PUBLICATIONS

A.V. Rapoport, "Influence of superconducting fluctuations on the thermoelectric power of a dirty conductor", Sov. Phys. Solid State 33(1), (1991), pp. 309–316.

Furukawa Electric Co. Ltd.; "Method of Estimating Critical Current of Oxide Superconductor and Method of Discriminating Quality of Oxide Superconductor", Pat. Ab. of Jap., JP,A,2–201172, (1990), p. 103.

Fujikura Ltd., "Thermoelectric Power Measuring Method", Pat. Ab. of Jap., JP,A,63–265150, (1988), p. 68.

Asukr Radiotechn, "Superconductive foil quality dtermination by recording voltampere characteristic below superconduction temp.", Derwent Abstracts Accession No. 87–197035/28 (1988).

A. Mawdsley et al., "Thermoelectric power and electron–phonon enhancement in $YBa_2Cu_3O_{7-\delta}$", Nature, vol. 328, Issue No. 6127, (1987), contents page and pp. 233–234.

M.R. Presland et al., "General trends in oxygen stoichiometry effects on $T_c$ in Bi and Tl superconductors", Physica C176 (1991), pp. 95–105.

J.B. Torrance et al., "Properties that change as superconductivity disappears at high–doping concentrations in $La_{2-x}Sr_xCuO_4$", Phys. Rev. B vol. 40 (1989), pp. 8872–8877.

(List continued on next page.)

Primary Examiner—Kenneth A. Wieder
Assistant Examiner—Barry C. Bowser
Attorney, Agent, or Firm—Dann, Dorfman, Herrell and Skillman, P.C.

[57] ABSTRACT

The invention comprises a method for determining the hole or electron concentration, transition temperature, ratio $T_c/T_c(max)$, or state of doping of a material capable of exhibiting superconductivity when cooled below its critical temperature, by measuring the thermopower of a sample of the material above the critical temperature of the material and determining from the thermopower the hole or electron concentration, transition temperature, ratio $T_c/T_c(max)$, or state of doping of the material as to whether it is underdoped, overdoped or optimally doped. The sample may be differentially heated and/or cooled to generate a temperature difference across the sample, the temperature difference across the sample measured, the voltage across the sample measured, and the hole concentration or similar determined from the measured temperature difference and the measured voltage. Means for determining the hole concentration, transition temperature, or doping of the material is also claimed.

7 Claims, 10 Drawing Sheets

OTHER PUBLICATIONS

H. Takagi et al., "Superconductor-to-nonsuperconductor transition in $(La_{1-x}Sr_x)_2CuO_4$ as investigated by transport and magnetic measurements", Phys. Rev. B vol. 40 (1989), pp. 2254–2261

J.L. Tallon, "Time-dependent charge transfer and the superconducting phase diagram for $YBa_2Cu_3O_{7-\delta}$", Physica C 176 (1991), pp. 547–550.

THERMOPOWER MAPPING OF SUPERCONDUCTING CUPRATES

TECHNICAL FIELD

The present invention comprises a method and means for determining the doped or chemical hole concentration in high-$T_c$ superconducting cuprates and related compounds.

The high-$T_c$ superconducting cuprates all have in common square-planar sheets of $CuO_2$ with Cu occupying the B-site of a perovskite unit and O atoms in the perovskite anion sites linking the corner-shared Cu atoms. These $CuO_2$ planes are the essential structural ingredient for superconductivity in these cuprate perovskites and superconductivity arises when holes or electrons are doped into the planes to a concentration exceeding a minimum ($p_{min}$ for holes, $n_{min}$ for electrons) and less than a maximum ($p_{max}$ and $n_{max}$ respectively). Without loss of generality, the bounds are established as $p_{min} \approx 0.05$ holes/Cu and $p_{max} \approx 0.27$ holes/Cu for the hole-type superconductors (see Presland et al, *Physica C* 176 (1991) 95–105), but are not yet clearly determined for the electron superconductors. In this specification the invention is described with reference to the hole-superconductors but qualitatively similar, although numerically different bounds are believed to apply for the electron superconductors and the invention and general principles disclosed herein also have application to the electron superconductors as will be apparent.

Figure 1:
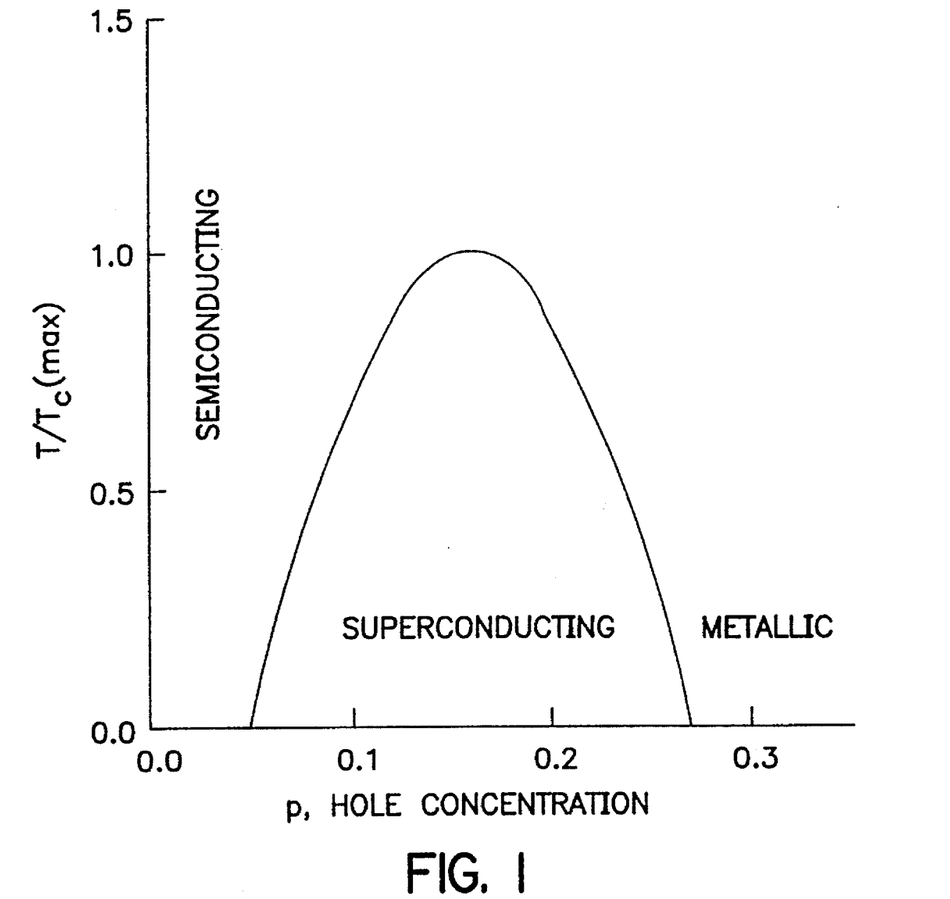
FIG. 1 is the schematic normalised plot of the superconducting phase diagram for cuprates as a function of the doped hole concentration.

FIG. 1 shows this general superconducting phase behaviour for the hole-doped superconductors. Superconductivity occurs for about $0.05 \leq p \leq 0.27$ and $T_c$ rises to a maximum $T_c(\max)$ at $p \sim 0.16$ following an approximately parabolic dependence on p, conveniently and without loss of generality, given by $$T_c/T_c(\max) \approx 1 - 82.6(p - 0.16)^2 \tag{1}$$

For about $p < 0.05$ the behaviour is semiconducting and insulating as $T \rightarrow 0$ while for about $p > 0.27$ normal metallic behaviour occurs. The parabolic curve in FIG. 1 was fitted to the data reported by Torrance et al, *Phys. Rev.* B40 (1989) 8872 and Takagi et al, *Phys. Rev.* B40 (1989) 2254, but it is likely that all other superconducting cuprates follow a similar curve. The domain $p < 0.16$ is referred to as underdoped and $p > 0.16$ as overdoped. Because of this common phase behaviour which is general to the superconducting cuprates, the chemical hole concentration is an important parameter whose determination makes it possible to locate a compound on the superconducting phase diagram, and moreover indicates whether, and by how much, the doping need be altered to maximise $T_c$ at $T_c(\max)$. Alternatively doping may be altered to maximise the critical current of the superconductor. To maximise critical current the material is generally overdoped to a degree. This doping can be controlled by alter-valent cation substitution or by changing the oxygen content in the cuprate. Such chemical manipulation is preferably carried out in such a way as to maintain the integrity of the $CuO_2$ planes and minimise disorder on these planes which can diminish $T_c$, by pair breaking, below the ideal phase curve $T_c = T_c(p)$. Measurement and control of the value of p allows the superconducting state to be fine-tuned.

BACKGROUND ART

Standard measurement of p is by determination of the cation composition by chemical analysis and determination of the oxygen content by high temperature thermal gravimetry during reduction in hydrogen or by chemical titration. These methods are complex, slow and destructive to the sample and with many of the superconducting cuprates is ambiguous because of mixed valency in solution.

DISCLOSURE OF INVENTION

In broad terms the invention comprises a method for determining the hole or electron concentration, transition temperature, ratio $T_c/T_c(\max)$, or the state of doping of a material capable of exhibiting superconductivity when cooled below its critical temperature, comprising measuring the thermopower of a sample of the material above the critical temperature of the material and determining from the thermopower the hole or electron concentration, transition temperature, ratio $T_c/T_c(\max)$, or whether the material is underdoped, overdoped or optimally doped for maximum $T_c$ or critical current.

The method of the invention may include subjecting the sample to heating and/or cooling to generate a temperature difference across the sample, measuring the temperature difference across the sample, measuring the electrical potential difference or voltage across the sample, and determining from the measured temperature difference and the measured electrical potential difference or voltage across the sample the hole or electron concentration, transition temperature, ratio $T_c/T_c(\max)$, or state of doping of the material.

The invention also comprises means for determining the hole or electron concentration, transition temperature, ratio $T_c/T_c(\max)$, or state of doping of a material capable of exhibiting superconductivity below its critical temperature, comprising:

two electrodes to contact a sample of the material between the electrodes, means for heating and/or cooling one or both of the electrodes to generate a temperature difference between the electrodes, temperature sensing means to indicate the temperature difference between the electrodes, means to measure the electrical potential difference or voltage between the electrodes, and means to determine from the measured temperature difference and the measured electrical potential difference or voltage between the electrodes the hole or electron concentration, transition temperature, ratio $T_c/T_c(\max)$ or state of doping of the material.

With the method of the invention the thermopower of a sample is measured at a given temperature, which may be room temperature, and the hole or electron concentration is determined from the measured thermopower. The method of the invention is simple, direct and non-destructive for determining p, and provides significant advantage in characterising these cuprates and assessing whether a superconducting cuprate is at optimum doping level. The process can be carried out quickly and is reliable and non-destructive.

By "superconducting cuprate" it is intended to mean the perovskite-related superconductors containing Cu and 0 atoms typically in square-planer $CuO_2$ sheets. These superconductors are commonly referred to as high-$T_c$ superconductors or high-temperature superconductors even though transition temperatures in some may be lower than 15K, for example, $Bi_2Sr_2CuO_6$. In some of these compounds there may be oxygen deficiency or excess in the $CuO_2$ sheets. The superconducting cuprates include without loss of generality $RBa_2Cu_3O_{7-\delta}$, $RBa_2Cu_4O_8$, $R_2Ba_4Cu_7O_{15-\delta}$ where R may be Y or a lanthanide rare-earth element, $Bi_2Sr_2Ca_{n-1}Cu_nO_{2n+4}$, $Tl_mBa_2Ca_{n-1}Cu_nO_{2n+m+2}$ where n=1, 2, 3 or 4 and m=1 or 2, $La_{2-x}Sr_xCuO_4$, $Tl_{0.5}Pb_{0.5}Sr_2Ca_{n-1}Cu_nO_{2n+3}$ where n=1, 2, 3 or 4 and many other such-like compounds which are well-known to those skilled in the art. These superconducting materials also include the many cation-substituted derivative compounds also well-known to those skilled in the art. The superconductors may be in bulk sintered or melt-processed form, thin films, thick films, wires or any composite form with metals or ceramics for substrates or sheathing.

DETAILED DESCRIPTION

Figure 2:
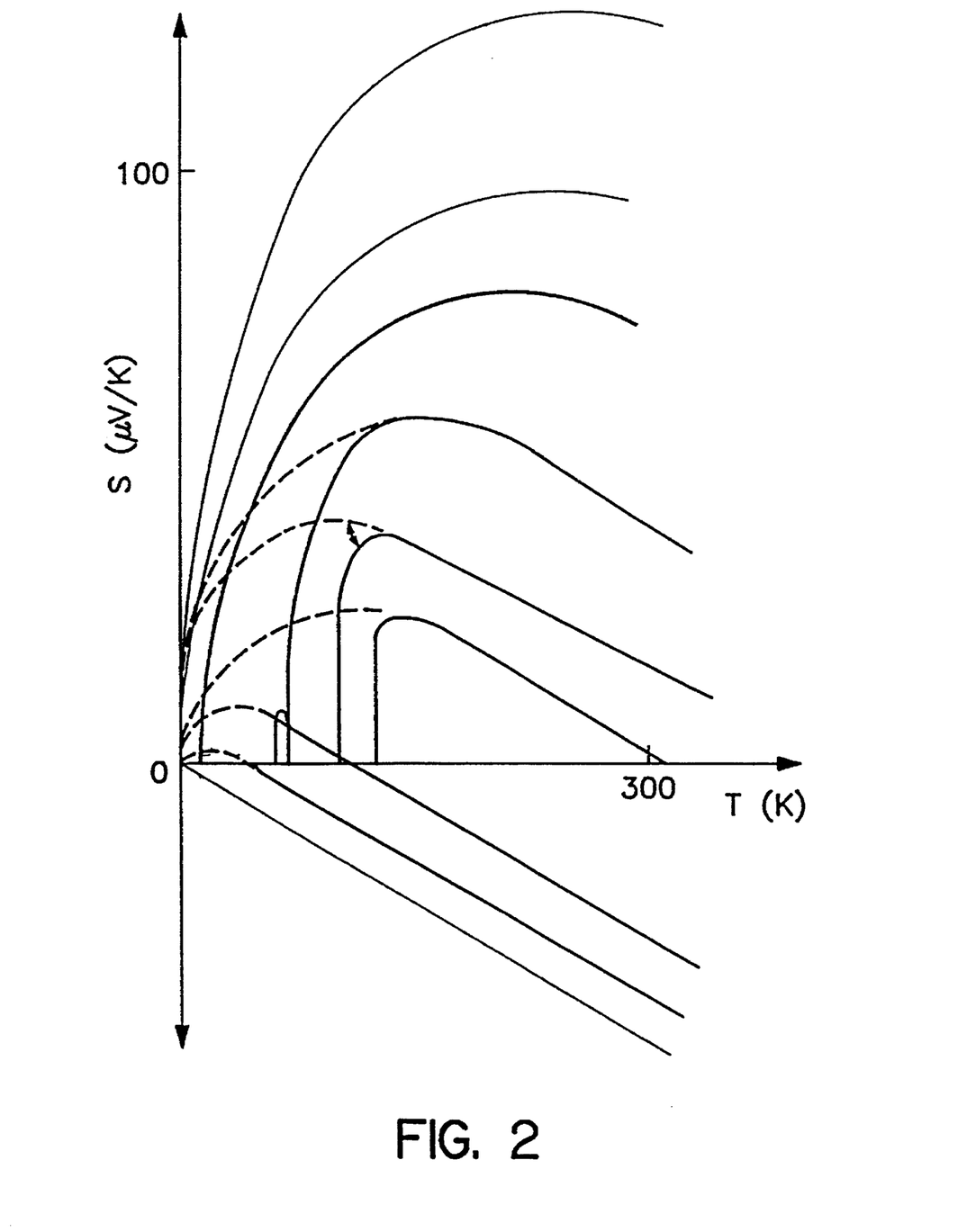
FIG. 2 is a schematic plot of the temperature dependence of the thermopower for superconducting cuprates for a range of hole concentrations across the superconducting phase diagram. The light solid curves are for the non-superconducting compositions while the heavy solid curves are for superconducting compositions. The dashed extensions show the expected thermopower in the absence of superconductivity and the vertical arrow shows the fluctuation contribution.
Figure 3:
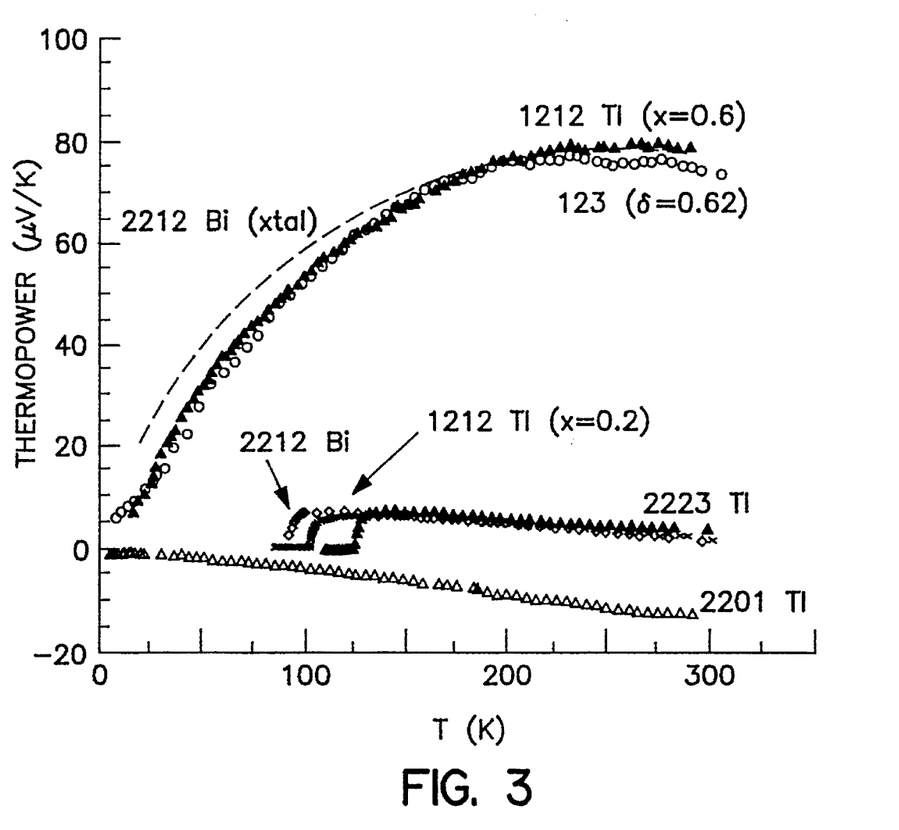
FIG. 3 shows the temperature dependence of the thermopower for three compositions with $p \sim p_{min}$ (2212-Bi, 123 and 1212-Tl), three with $p \sim p(T_c=T_c(max))$ (2212-Bi, 1212-Tl and 2223-Tl), and one for $p \sim p_{max}$ (2201-Tl).

FIG. 2 shows a schematic diagram of the temperature dependence of the thermopower for model cuprates at different hole concentrations, p, i.e. at different points across the phase curve. In the semiconducting domain the thermopower rises with increasing temperature to a peak which is large in value (100–500 μV/K) but in the superconducting compositions as p increases through 0.16, the peak moves to lower temperatures and above the peak the thermopower is linear in temperature. For larger values of p the linear behaviour is simply displaced downwards with little change in slope. At the hole concentration corresponding to $T_c(max)$ the thermopower at room temperature S(290K) is only slightly positive (2 to 3 μV/K) and changes sign in the overdoped region at a value of p slightly larger than that corresponding to $T_c(max)$. With continued doping, $T_c$ falls again and the linear T-dependent thermopower is displaced further downwards until, at $p \sim p_{max}$ where $T_c$ falls to zero, the thermopower is negative for all T and linear through the origin, i.e. it shows ideal metallic behaviour for a narrow bandwidth metal. Actual T-dependent data is shown in FIG. 3 for $YBa_2Cu_3O_{7-\delta}$ (123), $Bi_2Sr_2CaCu_2O_8$ (2212), $Tl_{0.5}Pb_{0.5}Sr_2CaCu_2O_7$ (Tl-1212), $Tl_2Ba_2Ca_2Cu_3O_{10}$ (Tl-2223) and $Tl_2Ba_2CuO_6$ (Tl-2201). 123, Bi-2212 (single-crystal) and Tl-1212 are shown at $p=p_{min}$, the latter two with Y substituted for Ca to reduce p; Bi-2212, Tl-1212 and Tl-2223 are shown at $T_c=T_c(max)$ and Tl-2201 is shown at $p=p_{max}$—the only compound for which data is available at this value of p. The single-crystal data for Bi-2212 is the a-b plane thermopower which in ceramic samples dominates over c-axis thermopower. The striking result illustrated by this figure is that for all of these varied compounds the thermopower has the same magnitude and T-dependence for a given value of p or for a given location on the superconducting phase curve, irrespective of whether the material is a sintered ceramic or a single crystal. It should be noted that for the optimum value of p for which $T_c=T_c(max)$ the thermopower S(T) rises to a maximum of 6 to 7 μV/K, then falls linearly to $S(290) \sim 2$ to 3 μV/K at room temperature. The thermopower appears to be unaffected by granularity and porosity. The data in FIG. 3 shows that a single-band model is applicable for the thermopower and there is no significant contribution from the charge-reservoir layers, $Bi_2O_2$, $Tl_2O_2$ and (Tl, Pb)O. The chain layer in 123 does contribute a component to the temperature-dependent thermopower which has positive slope when fully oxygen loaded ($\delta \sim 0.0$) but when oxygen deficient ($\delta > 0$) the chains do not contribute significantly. This figure also implies that the thermopower has a simple universal dependence on p. This is quantified—in FIG. 4 where the room temperature thermopower, S(290) is plotted as a function of p for all of the cuprates investigated. The values of p are determined either from bond valence sums using the parameter $V_{--}=2+V_{cu}-V_{02}-V_{03}$ (Tallon, Physica C 176 (1991) 547–550) or from the relative values of $T_c$ and $T_c(max)$ using equation (1). The data is plotted on a logarithmic scale in the underdoped region and on a linear scale in the overdoped region. Evidently the data for all of the compounds investigated fall on a single curve. Notably, S(290) on the universal curve changes sign just beyond $p \sim 0.16$, i.e. just beyond $T_c(max)$. By measurement of room temperature thermopower in any of these cuprates a direct deduction of the chemical hole concentration can be made by referring to this universal curve shown in FIG. 4 or a similar curve or information reflecting such a curve. Such a measurement is simple, quick and non-destructive.

Figure 8:
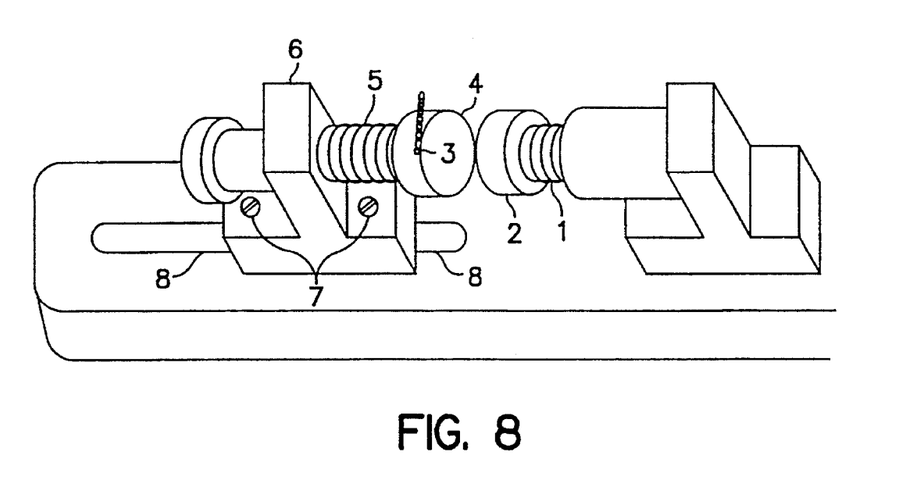
FIG. 8 shows a schematic diagram of a device for measuring the thermopower quickly and easily.

FIG. 8 shows a device (used in the following examples) for use with the method of the invention. The device was constructed using copper, and insulating components. This comprises a spring-loaded sample holder with heater (1) in the form of an electrical coil on the shaft of a fixed copper anvil (2) forming one electrode and a diode thermometer (3) on a second copper anvil (4) forming a second electrode, which is thrust against the sample by a spring (5) which is held by the locator post (6). The second, moveable anvil and spring can be relocated using the locator screw (7) which slides in a slot (8). In this way samples of widely varying geometry and size can be mounted in the device. The faces of the two anvils forming the electrodes have recessed copper-constantin thermocouples connected in differential fashion to determine the temperature difference between the two anvils and the two anvils have copper wires attached to allow measurement of the voltage difference between them. Microvoltmeters are used to measure the thermocouple voltage and the thermo-electric voltage induced between the electrodes when in operation. The device may be mounted on a long thin-walled stainless-steel tube with the electrical wires fed through the bore of the tube to allow dipping the device in a liquid helium dewar. In this way the thermoelectric power S(T) can be determined from room temperature down to 4K.

Figure 4:
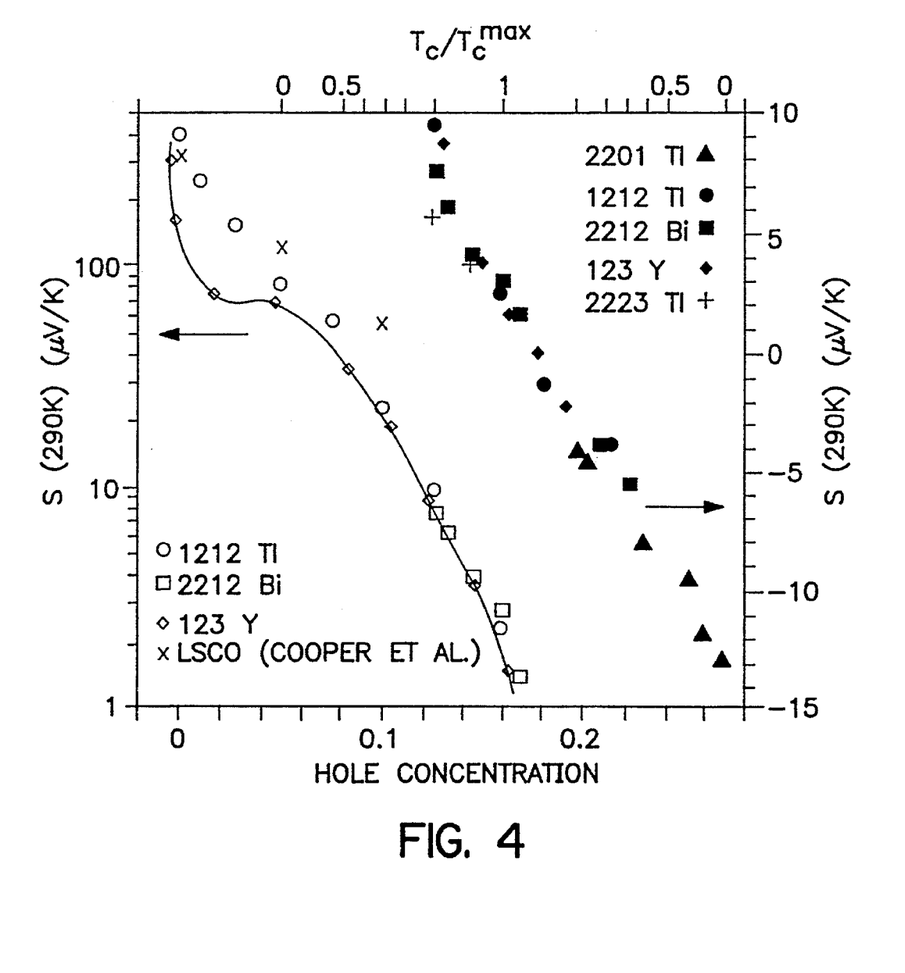
FIG. 4 shows the room temperature thermopower S(290K) plotted as a function of the hole concentration, p for a variety of superconducting cuprates.

A measuring instrument of the invention may comprise two electrodes, with one arranged to be heated (or one cooled or one heated and the other cooled), a temperature sensing means for indicating the temperature difference between the two electrodes, and thermocouples as in the FIG. 8 device or other means for indicating the potential difference between the two electrodes, and a microprocessor controller including a look-up table of data reflecting the universal curve of FIG. 4 or a similar curve to provide a readout of hole concentration for any samples measured (or electron concentration or the software could be configured to provide a readout of transition temperature, the ratio $T_c/T_c(max)$ or a readout indicating whether the sample is underdoped, overdoped or at optimal doping to maximise $T_c$).

The method of the invention is further illustrated by the following examples:

EXAMPLE 1

Figure 5:
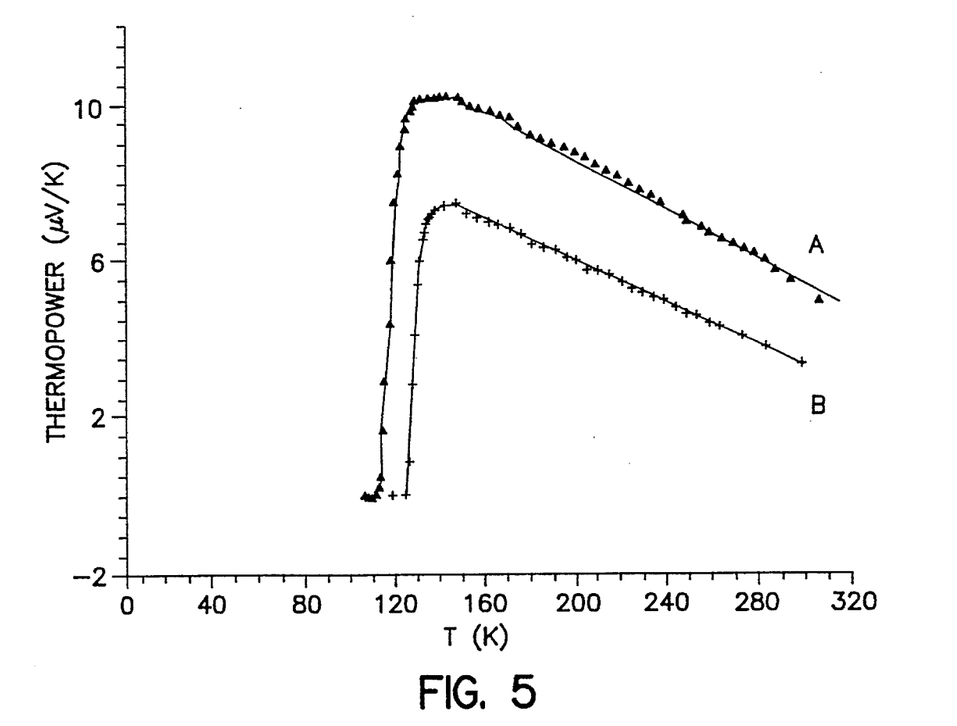
FIG. 5 shows the temperature dependence of the thermopower for Tl-2223 (A) as synthesised ($T_c \sim 118K$) and (B) after vacuum annealing ($T_c \sim 128K$).

The record $T_c$ value for any superconductor is exhibited by the Tl-2223 compound. This compound may have Ca occupying a fraction of the Tl sites and the chemical formula is more nearly $Tl_{1.7}Ba_2Ca_{2.3}Cu_3O_{10+\delta}$. As synthesised in oxygen at 1 atmosphere pressure $T_c \sim 118K$. A single-phase pellet of 2223 was prepared in the usual manner, then subjected to up to 10 days annealing, sealed under vacuum in a quartz tube. $T_c$, as measured from DC magnetisation, was raised to 128K. This is the highest reproducible $T_c$ exhibited by any superconductor. $T_c$ was raised in this case by a hole-doping process, possibly migration of Ca onto Tl-sites, or possible Tl loss by evaporation. The question remains as to whether $T_c$ can be further raised by further hole doping, for example, by loading additional oxygen or by further vacuum annealing. FIG. 5 shows the measured thermopower for the sample before ($T_c \sim 118K$) and after ($T_c \sim 128K$) vacuum annealing. In the former case the thermopower is typical of an underdoped sample, but in the latter it is typical of an optimally doped cuprate superconductor with $T_c=T_c(max)$. S(T) rises to a maximum of ~8 μV/K then falls linearly by −3 μV/K at room temperature. On this basis, because $T_c$ varies only weakly with p near the peak in the parabola, it cannot be expected to be raised more than another 1K. Indeed, subsequent oxygen loading, i.e. further hole doping, resulted in $T_c$ falling by about 1K. $T_c(max)$ would appear to be close to 128K for this compound. This result would have been ascertained just from measuring the room temperature value of the thermopower.

EXAMPLE 2

Figure 6:
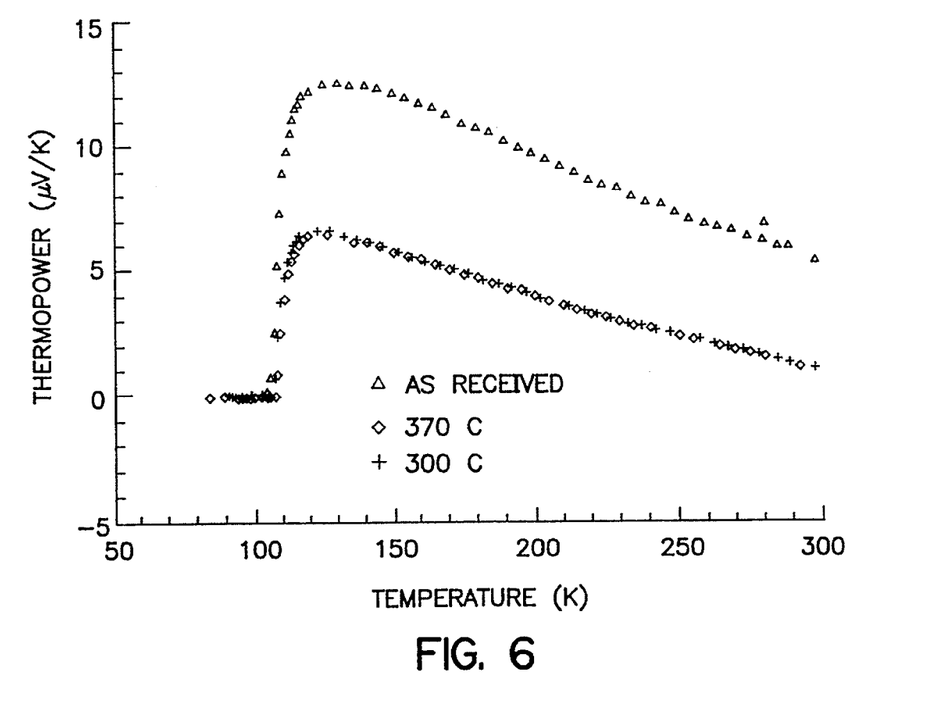
FIG. 6 shows the temperature dependence of the thermopower for Bi-2223 as synthesised (triangles) and after loading oxygen by annealing in oxygen at 370° C. (diamonds) and 300° C. (crosses).

A sample of $(Bi,Pb)_2Sr_2Ca_2Cu_3O_{10}$ was synthesised by conventional solid state reaction. As-synthesised $T_c=104K$ and the temperature dependence of the thermopower was measured. This is shown in FIG. 6 by the triangles. The maximum value of the thermopower S(max)~12.5 μV/K while the room temperature value S(290)~6 μV/K. It is clear from these values by consulting FIGS. 3 and 4, that the compound is slightly underdoped relative to $T_c(max)$. The sample was annealed in flowing oxygen at 370° C. for 12 hours and then at 300° C. for 12 hours. After each anneal, the temperature dependence of the thermopower was measured as shown by the diamonds and crosses in FIG. 6. By comparing with FIGS. 3 and 4 it is now clear that this sample is optimally doped for $T_c=T_c(max)$ and indeed $T_c$ had risen to 107K.

EXAMPLE 3

Figure 7:
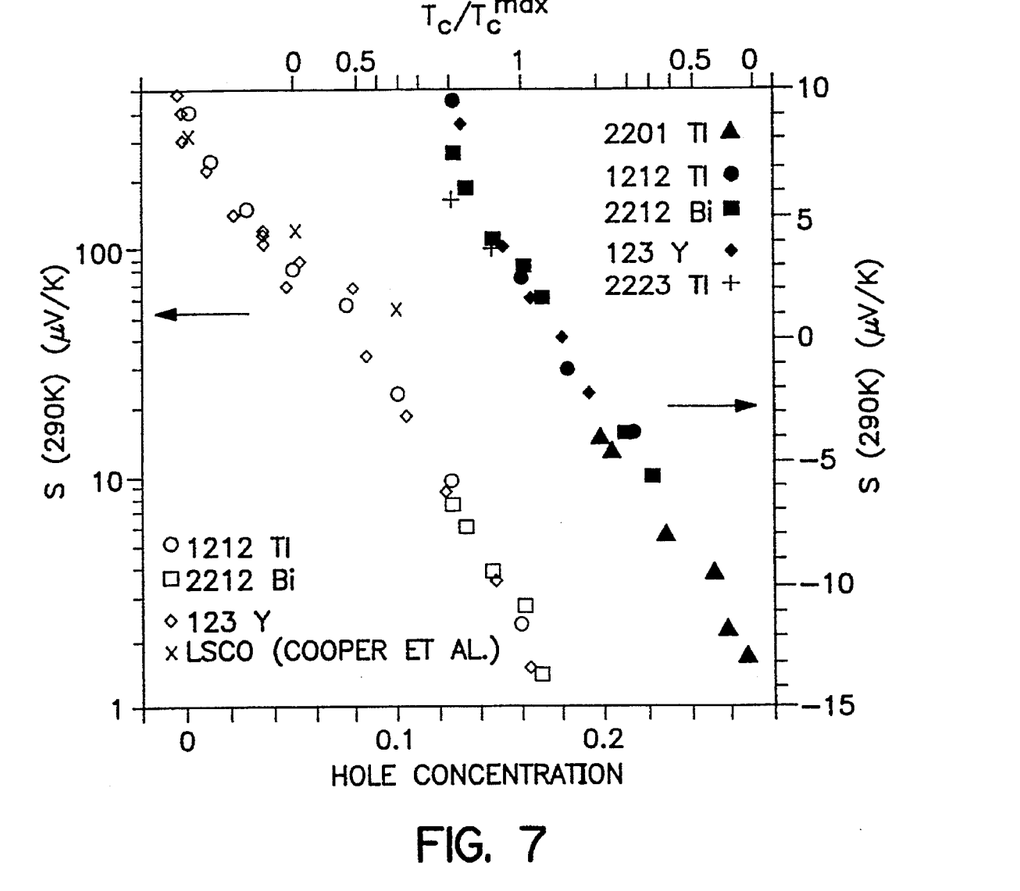
FIG. 7 shows the room temperature thermopower S(290K) plotted as a function of hole concentration for a variety of superconducting cuprates as in FIG. 4 but $YBa_2Cu_3O_{7-\delta}$ has been quenched to prevent oxygen-vacancy ordering.

The only exception to the common behaviour shown in FIG. 4 is the thermopower data for $YBa_2Cu_3O_{7-\delta}$ where near S=70 μV/K the data falls below that for other cuprate superconductors. This may arise from contributions to the thermopower from the CuO chains in the structure. When δ lies between 0.4 and 0.6 the oxygen vacancies have a tendency to order so that the chains alternate between full oxygen occupancy and full oxygen vacancy. The chains thus alternate with the composition . . . —Cu—CuO—Cu—CuO— . . . . Every second chain which is fully oxygenated has a high electrical conductivity compared to the $CuO_2$ planes for this region and since the contributions to the total thermopower from the chain and plane subsystems are weighted by their respective electrical conductivities then there is a significant contribution arising from the chains. The chain-originating thermopower is low (<10 μV/K) and consequently the total thermopower falls below that for other superconducting cuprates which do not possess chain subsystems. $YBa_2Cu_3O_{7-\delta}$ was annealed and quenched rapidly into liquid nitrogen sufficient to ensure that oxygen vacancy ordering could not take place. The disorder thus induced and frozen in on the chains ensures that the thermopower is not significantly affected by the chains. The data thus obtained is shown in FIG. 7 and evidently the $YBa_2C_3O_{7-\delta}$ data now matches that of the other superconducting cuprates.

EXAMPLE 4

Figure 9:
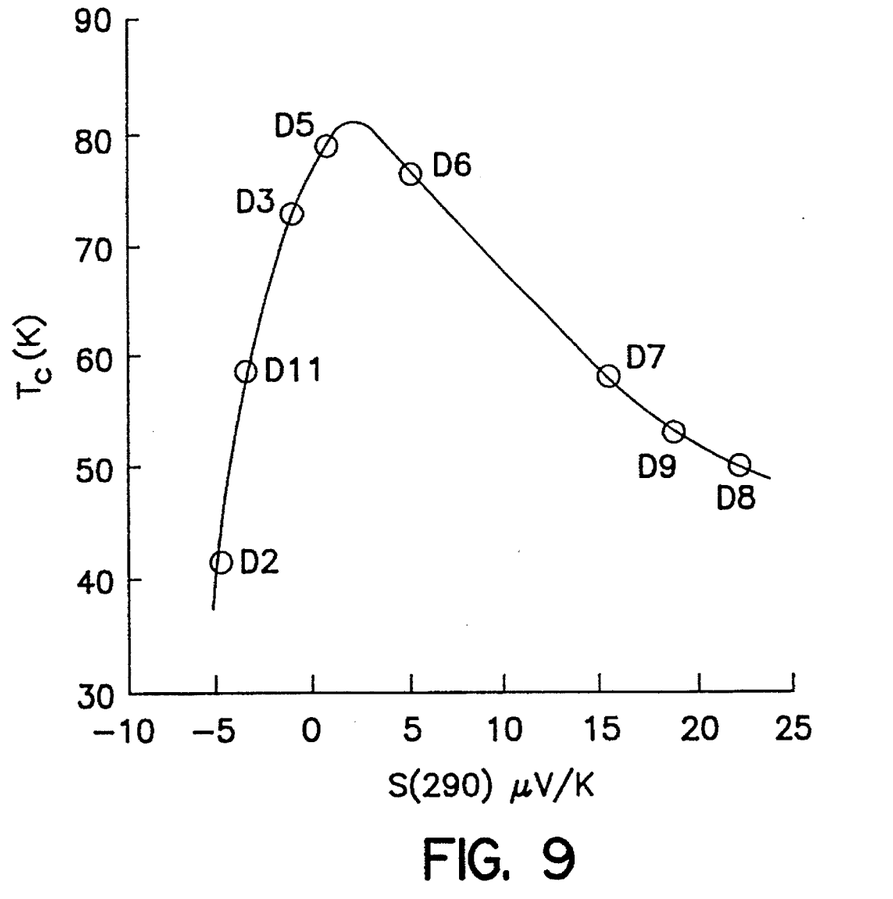
FIG. 9 shows transition temperature $T_c$ plotted against the room temperature thermopower S(290) for $Yb_{0.7}Ca_{0.3}Ba_{1.6}Sr_{0.4}Cu_3O_{7-\delta}$ for several different oxygen contents, $\delta$.
Figure 10:
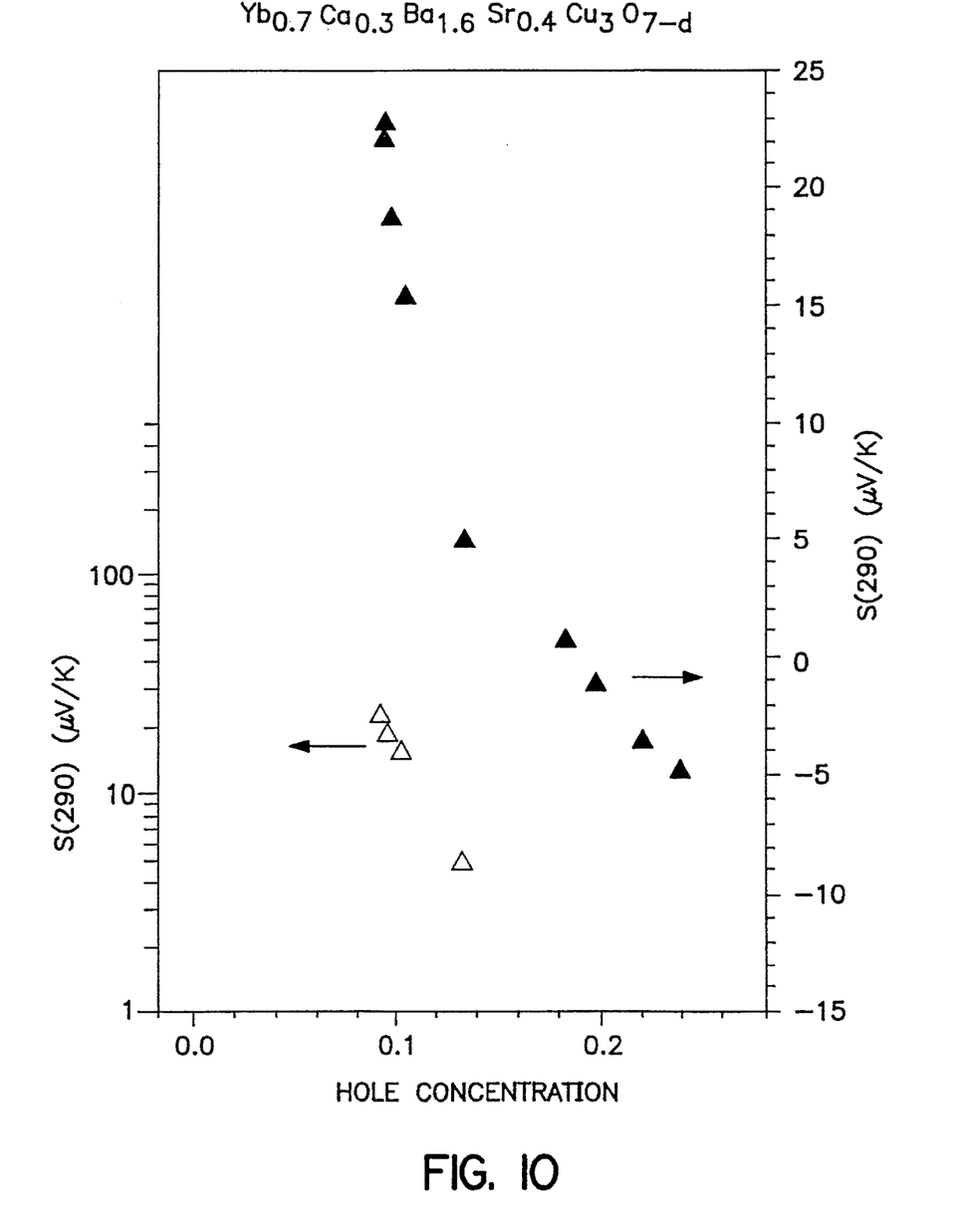
FIG. 10 shows S(290) plotted against the hole concentration for $Yb_{0.7}Ca_{10.3}Ba_{1.6}Sr_{0.4}Cu_3O_{7-\delta}$ deduced using equation (1).

A sample of $Yb_{0.7}Ca_{0.3}Ba_{1.6}Sr_{0.4}Cu_3O_{7-\delta}$ was prepared by synthesis at 850° C. in flowing gas of 1% oxygen and 99% nitrogen. The sample was loaded with oxygen by slow cooling to 380° C. in oxygen at 40 bar pressure. The sample, in the form of a 12 mm diameter pellet approximately 2 mm thick, was placed and clamped between the spring-loaded anvils of the device of FIG. 8 and the thermoelectric power measured at room temperature. The whole operation of mounting and measurement takes no more than 100 seconds including applying the heater current and waiting for equilibration. The sample was then annealed in a certain oxygen partial pressure and temperature and after equilibration was quenched out into liquid-nitrogen in order to freeze in the new oxygen content (as quantified by δ in the chemical formula). The room temperature thermoelectric power was remeasured in the device and this process repeated for a variety of values of δ. Superconducting transition temperatures were also measured for each of these annealed samples. FIG. 9 shows $T_c$ plotted against the room temperature thermopower (S(290K)). $T_c$ is seen to be maximised for S(290)~2 μV/K exactly as proposed from FIGS. 4 or 7. The hole concentration, p, is estimated from $T_c/T_c(max)$ using equation (1) and S(290) is plotted against p in FIG. 10. Comparison with FIG. 4 or 7 shows that the behaviour of the sample follows the universal curve in precise quantitative fashion.

The scope of the invention is defined in the following claims:

What is claimed is:

1. A method for determining the hole or electron concentration, transition temperature, ratio $T_c/T_c(max)$, or state of doping of a material capable of exhibiting superconductivity when cooled below its critical temperature, comprising measuring the thermopower of a sample of the material at a temperature above the critical temperature of the material and determining from the thermopower the hole or electron concentration, transition temperature, ratio $T_c/T_c(max)$, or state of doping of the material as to whether it is underdoped, overdoped or optimally doped for maximum $T_c$ or critical current.

2. A method of determining the hole or electron concentration, transition temperature, ratio $T_c/T_c(max)$, or state of doping of a material capable of exhibiting superconductivity below its critical temperature, comprising subjecting the sample to heating and/or cooling to generate a temperature difference across the sample, measuring the temperature difference across the sample, measuring the electrical potential difference or voltage across the sample, and determining from the measured temperature difference and the measured electrical potential difference or voltage across the sample the hole or electron concentration, transition temperature, ratio $T_c/T_c(max)$, or state of doping of the material as to whether it is underdoped, overdoped or optimally doped for maximum $T_c$ or critical current.

3. A method according to claim 2 comprising holding the sample of material between two electrodes and heating and/or cooling one or both of the electrodes to generate the temperature difference between the electrodes, measuring the temperature difference across the material by measuring the temperature difference between the electrodes, and measuring the electrical potential difference or voltage across the material by measuring the electrical potential difference or voltage between the electrodes.

4. A method according to any one of claims 1 to 3, wherein the superconductor is a cuprate-based superconductor including a high $T_c$ superconductor.

5. A method as claimed in any one of claims 1 to 3 wherein the superconductor is a hole-doped cuprate superconductor.

6. A method according to claim 4 wherein the superconductor comprises:

a) $RBa_2Cu_3O_{7-\delta}$, $RBa_2Cu_4O_8$, or $R_2Ba_4Cu_7O_{15-\delta}$ where R is Y or a lanthanide rare-earth element, or a derivative thereof obtained by partial substitution of Ba or Cu;

b) $Bi_2Sr_2Ca_{n-1}Cu_nO_{2n+4}$ where n=1, 2, 3 or 4, or a derivative thereof obtained by partial substitution of Bi, Sr, Ca or Cu;

c) $Tl_mBa_2Ca_{n-1}Cu_nO_{2n+m+2}$ where n equals 1, 2, 3 or 4 and m equals 1 or 2 or a derivative thereof obtained by partial substitution of Tl, Ba, Ca or Cu;

d) $La_{2x}Sr_xCuO_4$ where x is between 0 and 0.35 or a derivative thereof obtained by partial substitution of La, Sr or Cu; and e) $Tl_{0.5}Pb_{0.5}Sr_2Ca_{n-1}Cu_nO_{2n+3}$ where n equals 1, 2, 3 or 4 or a derivative thereof obtained by partial substitution of Tl, Pb, Sr, Ca and Cu.

7. Means for determining the hole or electron concentration, transition temperature, ratio $T_c/T_c(max)$, or doping of a material capable of exhibiting superconductivity below its critical temperature, comprising:

two electrodes to contact a sample of the material between the electrodes, means for heating and/or cooling one or both of the electrodes to generate a temperature difference between the electrodes, temperature sensing means to indicate the temperature difference between the electrodes, means to measure the electrical potential difference or voltage between the electrodes, and means to determine from the measured temperature difference and the measured electrical potential difference or voltage between the electrodes the hole or electron concentration, transition temperature, ratio $T_c/T_c(max)$ or state of doping of the material for maximum $T_c$ or critical current.

* * * * *